3,468,791
ADSORPTION OF NAPHTHENES WITH A STRONTIUM TYPE X MOLECULAR SIEVE
William R. Epperly, New Providence, Chester L. Read, Westfield, and Maurice G. Lorenz, North Plainfield, N.J., assignors to Esso Research and Engineering Company, a corporation of Delaware
No Drawing. Filed May 14, 1965, Ser. No. 455,991
Int. Cl. C10g 25/04
U.S. Cl. 208—310      1 Claim

ABSTRACT OF THE DISCLOSURE

A strontium type X molecular sieve is used to separate naphthenes, and particularly two- and three-ring naphthenes from admixtures with at least one constituent from the group consisting of isoparaffins and normal paraffins.

---

The present invention relates to the separation of cyclic paraffins from mixtures comprising normal paraffins, isoparaffins, cycloparaffins or naphthenes. The invention, more particularly, relates to the separation of 2 and 3-ring naphthenes from mixtures of said naphthenes, isoparaffins and normal paraffins. It is also within the scope of this invention to remove cyclic olefins, particularly cyclic olefins having 2 and 3-rings from mixtures containing these olefins along with normal and isoolefins. The invention is also applicable to removing cyclic olefins and cyclic naphthenes which have more than 3 rings from the above-mentioned mixtures. This separation is accomplished, due to the unexpected finding that a strontium type X molecular sieve can effect an excellent separation of naphthenes, especially 2 and 3-ring naphthenes and most particularly 3-ring naphthenes from mixtures of isoparaffins, normal paraffins and naphthenes in which they are contained. A strontium type X molecular sieve may also be utilized to separate 2 and 3-ring cyclic olefins from mixtures of cyclic olefins, normal olefins and isoolefins.

There are numerous instances where the separation of cycloparaffins or naphthenes is important in industry. It should be noted that the terms cycloparaffins and naphthenes are synonyms and may be used interchangeably. A particular interest in the present day world of high speed jet transportation is the desire to manufacture ultra-high luminometer number jet fuels and kerosenes. Kerosenes are utilized for jet fuel. A desirable jet fuel must have a high luminometer number as well as a high B.t.u. value. B.t.u. is an abbreviation for the term British thermal unit. This is the amount of heat required to raise 1 pound of water from 39° F. to 40° F. If a jet fuel has a high B.t.u. value, less fuel and, consequently, less weight is required to serve the needs of the jet engine. Normal and isoparaffins have the highest B.t.u. value as well as the highest luminometer number when compared to naphthenes or aromatics.

Naphthenes, as mentioned above, have lower values than normal and isoparaffins in both respects; the B.t.u. value of naphthenes becomes progressively worse with increased numbers of naphthene rings. That is to say, a naphthene with 2 rings has a poorer B.t.u. value than a naphthene with 1 ring and a naphthene with 3 rings would have a poorer value than one with 2 rings. This relationship continues as the number of rings in the particular naphthene increases. Consequently, in the manufacture of jet fuel it is of paramount importance to remove the naphthenes, especially those having 2, 3 and more rings as well as derivatives of these multi-ring naphthenes.

Luminometer number is a dimensionalest term which is used as a measure of flame temperature at a fixed flame radiation in the green-yellow band of the visible spectrum. The luminometer number of a fuel can be correlated with the combustion characteristics of fuels for use in jet engines and the like. It is determined by a technique described in ASTND–1740. As the luminometer number of a fuel increases, its performance characteristics increase. The luminometer number of a jet fuel is important and must be carefully guarded.

Another area where removal of naphthenes is extremely useful is in the recovery of naphthenes for lubes and high density jet fuels, since naphthenes have a high density. A still further use would be in the manufacture of high V.I. lubes by naphthene removal. A further field of applicability for this invention would be in the recovery of pure, normal paraffins. In this instance, it is found that normal paraffins from most petroleum sources contain naphthenes which can be removed by means of the process outlined by the instant invention.

In recovering normal olefins from various refinery streams, it has been found that the streams usually contain cyclic olefins. These cyclic olefins must be removed in order to produce an olefin stream which is satisfactory for the synthesis of biodegradable alkylbenzene sulfonate detergent. If large amounts of cyclic olefins are present, the detergent is not biodegradable.

In the past, a variety of methods have been utilized to separate these cyclic hydrocarbons. However, both cyclic paraffins and cyclic olefin separations have met with extremely limited success. One method used currently for the manufacture of high luminometer number jet fuel will serve to illustrate this point. This method involves a catalytic dehydrogenation step to convert naphthenes to aromatics followed my solvent extraction to remove the aromatics. This procedure does not actually recover the naphthenes as such, although the aromatics recovered could be rehydrogenated to make naphthenes. In addition, the selectivity of the catalytic dehydrogenation step is such that 1-ring naphthenes are more readily dehydrogenated than 2-ring or 3-ring naphthenes. This is undesirable since it is the most condensed naphthenes that contribute most strongly to lowering the luminometer number. A process such as that of the instant invention serves to raise the concentration of 2 and 3-ring naphthenes relative to 1-ring naphthenes in the adsorbed component when utilizing a strontium type X molecular sieve to adsorb part of a naphthene containing feedstream.

This further illustrates the need for a process such as that of the instant invention. As mentioned previously, it is the 2 and 3-ring naphthenes that contribute most to the lowering of the luminometer number in jet fuel. With the rising importance of Mach II and Mach III airplanes, in both military and commercial fields, the need for high grade jet fuels has increased astronomically. The projected requirements in this area indicate that the need will continue to multiply. In order to satisfy this need, a process must be developed which will result in the removal of as large a quantity of the 3-ring naphthenes as possible. To be sure, it is also desirable to remove as large a quantity of the 2-ring naphthenes as possible, but they are not so troublesome as the 3-ring variety.

Other attempts to specifically remove these 2 and 3-ring naphthenes have been varied in scope. It has been attempted to catalytically crack and thereby dehydrogenate the naphthenes. This would result in the transformation of the naphthenes to aromatics which can subsequently be extracted. However, the cracking reaction is not selective and the paraffins which are a desired material are cracked along with the naphthenes. Hydroforming does not affect the 3-ring naphthenes.

According to this invention, it has unexpectedly been discovered that naphthenes or cycloparaffins which are in admixture with normal paraffins and isoparaffins can be selectively adsorbed onto a zeolitic adsorbent which is classified as a strontium type X molecular sieve. The presence of aromatics in this mixture does not prevent the adsorption of the cycloparaffins. Rather, the cycloparaffins and aromatics are both adsorbed onto the strontium type X sieve. Cycloolefins may also be adsorbed from mixtures of normal, isoolefins and cyclic olefins onto a strontium type X zeolitic adsorbent or molecular sieve. Some of the naphthenes to be removed by the instant invention include: cyclohexane, decalin, perhydroanthracene and perhydrophenanthrene as well as alkyl derivatives of these compounds. The invention is particularly effective in removing naphthenes having 2 and 3 rings as well as alkyl derivatives thereof. This invention also includes the removal of naphthenes having more than 3 rings.

Naturally-occurring crystalline, hydrated metal, alumino-silicates are called zeolites.

It has been known for some time that certain zeolites both naturally occurring and synthetic, have the property of separating normal from branched-chain isomeric hydrocarbons as well as cyclic and aromatic admixtures. The zeolites have crystal patterns such as deformed structures containing large numbers of small cavities interconnected by a number of still smaller holes or pores, latter being of exceptionally uniform size. Only molecules small enough to enter the pores can be adsorbed, though not all molecules, even though small enough to enter the pores, will be adsorbed. An affinity of the molecule for the adsorbent must be present. The pores may vary in diameter from 3 to 6 A. to 8 to 15 or more A., but it is a property of these zeolites or molecular sieves that for a particular size the pores are substantially of uniform size. The adsorbents with pore sizes of 8 to 15 A. have a selectivity for aromatics and non-normal hydrocarbons whereas the smaller adsorbents with respect to pore size, that is to say those of about 3 to 6 A., have a higher selectivity for straight-chain compounds such as normal paraffins and normal olefins. Adsorbents with pore size of 8 to 15 A. are known as type X sieves.

The scientific and patent literature contain numerous references to the adsorbing action of natural and synthetic zeolites. Among the natural zeolites having sieve property may be mentioned chabazites and analcite. A synthetic zeolite with molecular sieve properties is described in U.S. Patent 2,442,191. An example of a class of synthetic zeolites which is used to separate normal hydrocarbons from branched hydrocarbons is type A sieve with divalent cations from the alkaline earth sieves, particularly calcium type A. These adsorbents are described in U.S. Patent 2,882,243.

An example of a class of adsorbents which is used to separate aromatics and non-hydrocarbons from saturates is type X sieve with monovalent and divalent cations from the alkaline and alkaline earth sieves, particularly sodium and calcium type X. These adsorbents are described in U.S. Patent 2,882,244. A strontium type X sieve may be produced by converting the Na form of type X sieve.

Zeolites vary somewhat in composition, but generally contain silica, aluminum, oxygen and an alkali or alkaline earth element, e.g. sodium. An excellent treatment of the entire subject of molecular sieves is to be found in an article "Molecular Sieve Separation of Solids" appearing in Quarterly Reviews, volume 3, pages 293–330 (1949) published by The Chemical Society (London).

It has been unexpectedly discovered, according to this invention, that cycloparaffins or naphthenes, especially 2-ring napthenes and most especially 3-ring naphthenes, in admixture with normal paraffins and isoparaffins alone, or in combination with one another, may be selectively adsorbed onto a strontium X zeolitic adsorbent. The other type X zeolitic adsorbent is capable of adsorbing the naphthenes but not nearly so successfully as will subsequently be illustrated in the examples. Since the removal of naphthenes, particularly 2 and 3-ring naphthenes as well as alkyl substituted naphthenes and naphthenes containing more than 3 rings is extremely important, the mere removal of a portion of the naphthenes is not sufficient. As great an amount as possible of these troublesome constituents must be removed. Consequently, a strontium type X zeolitic adsorbent represents a substantial improvement over the art because this sieve is capable of removing a significantly larger amount of the undesired naphthenic constituents from admixtures with either normal paraffins or isoparaffins or mixtures comprising normal paraffins, isoparaffins and cycloparaffins. In practice, most feedstreams contain aromatics in addition to the above-named components. In such a case, additional adsorbent may be required to adsorb the aromatics as well as the naphthenes. The aromatics may be removed prior to passing the naphthene-containing mixture through the sieve separation zone. However, another unexpected finding of this invention concerns the fact that naphthenes and aromatics if present together will be adsorbed simultaneously in comparable amounts onto a strontium type X zeolitic sieve. This is totally unexpected since it is thought that the sieve will have a much greater attraction for aromatics.

In keeping with the above unexpected finding, it has also been found that cyclic olefins, preferably those cyclic olefins having 2 or 3 or more condensed rings and alkyl derivatives of these cyclic olefins may be separated from mixtures with isoolefins or normal olefins. The mixture may contain both isoolefins and normal olefins or either constituent wtih the cylic olefins.

It is apparent that this invention will be significant in treating jet fuel and kerosene. In addition, other feedstreams which may be treated satisfactorily with the process of the instant invention include lubricating oil, hydraulic and other specialty oils.

This process is of special interest in the manufacture of jet fuels of high luminometer number and high B.t.u. content for use at Mach II and III. With highly naphthenic crudes, removal of all the aromatics from the jet distillate may still give a fuel of inadequate quality for conventional jet planes. Removal of naphthenes by the process of this invention will give adequate quality.

More specifically, the preferred embodiment of the process of the instant invention comprises two steps, absorption and desorption, which are both carried out preferably in the vapor phase at about atomspheric pressure. However, the invention may also be carried out in the liquid phase at superatmospheric pressure conditions. Additionally, one may utilize sub-atmospheric conditions if desired. With respect to temperature, temperatures of 70° through 800° F. may be utilized, preferably 70° through 750° F., most preferably about 500° through 725° F. Space velocities for the introduction of feedstock into the strontium X molecular sieve zone will vary from .2 to 10 w./w./hr., preferably .5 to 5; most preferably 1 to 2 w./w./hr. These velocites are a function of the feed being treated and the results one wishes to obtain.

Desorption of the naphthenes can be effected by lowering total pressure, raising temperature, purging with an inert gas, displacement with a gas which is adsorbed i.e. a displacing agent, or a combination of any of these.

The preferred method of desorption is with a displacing agent. A displacing agent is defined as a polar or polarizable material having an appreciable affinity for the zeolitic adsorbent compared with the material to be desorbed. Displacing agents are also referred to as desorbents and displacing mediums. Suitable displacing agents for the process of this invention include $SO_2$, ammonia, carbon dioxide, $C_1$–$C_5$ alcohols, such as methanol and propanol, glycols such as ethylene glycol and propylene glycol, halogenated compounds such as methyl chloride, ethyl chloride, methyl fluoride, nitrated compounds, such as nitromethane and the like. Preferably, the displacing agent will be used in the gaseous state. One of the preferred displacing agents has the general formula:

wherein $R_1$, $R_2$ and $R_3$ are selected from the group consisting of hydrogen and $C_1$ through $C_5$ alkyl radicals. Thus, the desorbing material includes ammonia and primary, secondary and tertiary amines. Ammonia is the most desirable of all the displacing agents.

The full time for adsorption may be varied between 1 minute and several hours, preferably an adsorption of 5 minutes to one hour is utilized, and most preferably 5 to 30 minutes. Many variations during the adsorption cycle should be apparent, worthy of note is the fact that displacing agent may be introduced along with the feedstream in order to facilitate absorption.

The desorption cycle may take place at a temperature between 300° and 900° F., preferably 500° to 750° F. and most preferably 550° to 700° F. The pressure during desorption will vary between 1 and 100 p.s.i.a., preferably 15 to 65 p.s.i.a., most preferably 15 to 35 p.s.i.a. The displacing agent should be introduced at a rate of .1 to 10 w./w./hr., preferably 0.5 to 5 w./w./hr. and most preferably 0.8 to 3 w./w./hr.

When utilizing only 0.202 w./w./cycle of sievate with a calcium X sieve, 2.6 wt. percent of 3-ring naphthenes was found in the sievate and 9.1 wt. percent of 2-ring naphthenes. This also compares quite unfavorably to the strontium X molecular sieve where utilizing more sievate produced a lower amount of 2 and 3-ring naphthenes. Further reiteration of the table is not in order since it may be readily studied and comprehended. Suffice it to say the advantages of the strontium X sieve versus the calcium X molecular sieve and the barium X molecular sieve are readily apparent.

A variation within the scope of this invention would include catalytic reforming of a feed stock, such as a jet fuel, prior to the introduction of the fuel into the strontium type X molecular sieve separation zone. The reforming would serve to convert 1 and 2-ring naphthenes to benzene and condensed ring aromatics; the 3-ring naphthenes would be unaffected by the reforming and would then be removed by means of a strontium X type sieve producing an ideal jet fuel. Any of the well-known catalytic reforming techniques may be utilized for this. These include Powerforming, Platforming, Catforming, Houdriforming, etc. These techniques are all well-known in the art and need not be discussed further at this time.

Although this invention has been described with some

EXAMPLE

TABLE I.—CYCLIC RUNS ON S. LA. JET FUEL DISTILLATE

| Sieve | Sievate yield, w./w./cycle | L.N.[1] | Paraffins, wt. percent | Naphthenes | | |
|---|---|---|---|---|---|---|
| | | | | 1-ring, wt. percent | 2-ring, wt. percent | 3-ring, wt. percent |
| Ba-X | 0.127 | 85 | 57.7 | 30.6 | 8.0 | 1.4 |
| | 0.239 | 69 | 50.1 | 29.0 | 9.9 | 3.1 |
| | 0.397 | 66 | 47.9 | 28.3 | 10.0 | 3.2 |
| | 0.909 | 58 | 45.3 | 27.1 | 10.0 | 3.2 |
| Sr-X | 0.224 | 91 | 59.5 | 33.0 | 5.7 | 0.6 |
| | 0.307 | 88 | 57.9 | 32.5 | 6.9 | 1.2 |
| | 0.717 | 65 | 48.6 | 28.5 | 10.2 | 3.2 |
| Ca-X | 0.202 | 80 | 54.7 | 30.5 | 9.1 | 2.6 |
| | 0.379 | 70 | 50.8 | 28.9 | 10.1 | 3.2 |
| | 0.824 | 62 | 47.8 | 27.8 | 9.9 | 3.1 |
| Feed stock | | 54 | 45.35 | 24.6 | 9.5 | 3.5 |

[1] Luminometer Number.

The above table, Table I, indicates clearly the improvements which are realized when utilizing a strontium type X molecular sieve as compared to other type X sieves. The conditions were uniform throughout the entire series of runs. All runs were made under constant conditions; the adsorption was at 1 w./w./hr., 650° F. and 1 atmosphere of pressure. The desorption took place using ammonia as a displacing agent; the displacing agent was introduced at a rate of 1 w./w./hr., a temperature of 650° F. and a pressure of 1 atmoshpere.

Turning to the runs themselves, it is apparent from the table that a sievate yield of .307 from a strontium X sieve contained only 1.2 wt. percent of 3-ring naphthenes and 6.9 wt. percent of 2-ring naphthenes. When utilizing a barium X sieve a sievate yield of .239 w./w./cycle resulted in 3.1 wt. percent of 3-ring naphthenes in the sievate and 9.9 wt. percent of 2-ring naphthenes. This is exactly the opposite of what would be expected, more material passed over the strontium X sieve than passed over the barium X sieve but a larger amount of 2 and 3-ring naphthenes was found in the sievate from the barium type X molecular sieve.

degree of particularity, it is intended to be limited only by the attached claim.

What is claimed is:

1. A process for separating 1, 2 and 3-ring naphthenes from mixtures of said naphthenes and at least one constituent from the group consisting of normal paraffins and isoparaffins which comprises catalytically reforming the 1 and 2-ring naphthenes, contacting the reformed mixture with a strontium type X molecular sieve whereby the said 3-ring naphthenes are removed.

References Cited

UNITED STATES PATENTS

| 2,988,502 | 6/1961 | Ricards et al. | 260—676 |
| 3,182,017 | 5/1965 | Fleck et al. | 208—310 |
| 3,242,070 | 3/1966 | Epperly et al. | 208—310 |

HERBERT LEVINE, Primary Examiner

U.S. Cl. X.R.

208—15, 95, 99; 260—666